(12) United States Patent
Mastrup et al.

(10) Patent No.: US 11,738,975 B2
(45) Date of Patent: Aug. 29, 2023

(54) METHOD FOR INSTALLING COMPONENTS OF A WIND TURBINE

(71) Applicant: Siemens Gamesa Renewable Energy A/S, Brande (DK)

(72) Inventors: Aage Mastrup, Spjald (DK); Hans Rico Larsen, Ejstrupholm (DK); Niclas Damgaard Quist, Middelfart (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 140 days.

(21) Appl. No.: 16/605,523

(22) PCT Filed: Dec. 8, 2017

(86) PCT No.: PCT/EP2017/082061
§ 371 (c)(1),
(2) Date: Oct. 16, 2019

(87) PCT Pub. No.: WO2018/192675
PCT Pub. Date: Oct. 25, 2018

(65) Prior Publication Data
US 2020/0122981 A1    Apr. 23, 2020

(30) Foreign Application Priority Data
Apr. 18, 2017    (DE) .................... 10 2017 206 527.3

(51) Int. Cl.
*B66C 13/00*    (2006.01)
*B66C 13/06*    (2006.01)
(Continued)

(52) U.S. Cl.
CPC .......... *B66C 13/063* (2013.01); *B66C 23/185* (2013.01); *F03D 13/10* (2016.05); *B66C 2700/0371* (2013.01)

(58) Field of Classification Search
CPC combination set(s) only.
See application file for complete search history.

(56) References Cited

U.S. PATENT DOCUMENTS 2,916,162 A * 12/1959 Gercke ................... B66C 13/06
                                                  200/61.13
3,210,114 A * 10/1965 Lawton ................... B66C 13/08
                                                  414/754
(Continued)

FOREIGN PATENT DOCUMENTS

CN    203428775 U    2/2014
CN    105604790 A    5/2016
(Continued)

OTHER PUBLICATIONS

Chinese Office Action for Application No. 201780089818.7, dated May 22, 2020.
(Continued)

*Primary Examiner* — Emmanuel M Marcelo
(74) *Attorney, Agent, or Firm* — Schmeiser, Olsen & Watts LLP

(57) ABSTRACT

Provided is a method for installing components of a wind turbine, with a lifting device for lifting the respective component hanging at the lifting device via at least one cable, whereby at least one stabilization device is stabilizing the component against vibrations induced by external forces by a gyroscopic effect.

12 Claims, 8 Drawing Sheets

(51) Int. Cl.
*F03D 13/10* (2016.01)
*B66C 23/18* (2006.01)

(56) References Cited

U.S. PATENT DOCUMENTS

| | | | | |
|---|---|---|---|---|
| 3,524,606 | A * | 8/1970 | Coski | B66D 1/365 |
| | | | | 242/484 |
| 3,536,298 | A * | 10/1970 | Deslierresjohn | B63B 21/663 |
| | | | | 114/244 |
| 3,608,384 | A * | 9/1971 | Hardin | B66C 13/08 |
| | | | | 74/5.22 |
| 3,799,358 | A * | 3/1974 | Putnam | B66C 13/08 |
| | | | | 294/81.4 |
| 3,874,514 | A * | 4/1975 | Wilson | B66C 17/10 |
| | | | | 212/290 |
| 4,883,184 | A * | 11/1989 | Albus | B66C 13/08 |
| | | | | 212/323 |
| 5,765,703 | A * | 6/1998 | Shiwaku | B66C 13/06 |
| | | | | 212/274 |
| 5,871,249 | A * | 2/1999 | Williams | G01C 21/18 |
| | | | | 74/5.34 |
| 6,327,994 | B1 * | 12/2001 | Labrador | B63B 39/06 |
| | | | | 114/382 |
| 6,412,649 | B1 * | 7/2002 | Khachaturian | B66C 1/12 |
| | | | | 212/242 |
| 6,826,452 | B1 * | 11/2004 | Holland | B66C 23/00 |
| | | | | 318/568.22 |
| 8,070,000 | B2 * | 12/2011 | Botwright | B66C 13/08 |
| | | | | 212/227 |
| 8,368,241 | B2 * | 2/2013 | Toneaki | F03D 5/06 |
| | | | | 244/155 A |
| 8,511,645 | B2 * | 8/2013 | Taddei | F03D 13/20 |
| | | | | 254/338 |
| 8,820,718 | B2 * | 9/2014 | Weidner | B66D 1/00 |
| | | | | 254/332 |
| 9,896,311 | B2 * | 2/2018 | Bang | B66C 1/10 |
| 9,932,211 | B2 * | 4/2018 | Krijnen | E21B 17/1035 |
| 9,950,910 | B2 * | 4/2018 | Sørensen | B66C 23/185 |
| 10,156,223 | B2 * | 12/2018 | Bueno De Santiago | |
| | | | | B66C 23/185 |
| 10,822,206 | B2 * | 11/2020 | Manchester | B66C 13/085 |
| 10,941,023 | B2 * | 3/2021 | Roodenburg | B63B 27/10 |
| 2002/0040948 | A1 * | 4/2002 | Ragner | F03D 5/06 |
| | | | | 244/153 R |
| 2003/0183594 | A1 * | 10/2003 | Torres Martinez | B66C 23/207 |
| | | | | 212/196 |
| 2009/0097974 | A1 * | 4/2009 | Ippolito | B63H 9/071 |
| | | | | 290/55 |
| 2009/0278353 | A1 * | 11/2009 | Da Costa Duarte Pardal | |
| | | | | F03D 5/00 |
| | | | | 290/55 |
| 2010/0236161 | A1 * | 9/2010 | Livingston | F03D 13/10 |
| | | | | 52/745.18 |
| 2011/0074161 | A1 * | 3/2011 | Ippolito | F03D 5/06 |
| | | | | 290/55 |
| 2016/0200553 | A1 * | 7/2016 | Sørensen | B66C 23/185 |
| | | | | 212/273 |
| 2016/0297650 | A1 * | 10/2016 | Bang | B66C 13/085 |
| 2018/0362306 | A1 * | 12/2018 | Lopez-Benedito | F03D 13/10 |

FOREIGN PATENT DOCUMENTS

| | | | | |
|---|---|---|---|---|
| CN | 105793186 | A | | 7/2016 |
| DE | 102013219279 | A1 | | 3/2015 |
| JP | H11116181 | A | | 4/1999 |
| JP | 2014131940 | A | | 7/2014 |
| JP | 2015101413 | A | | 6/2015 |
| JP | 2016210607 | A | | 12/2016 |
| KR | 20150102518 | A | | 9/2015 |
| KR | 20150111415 | A | * | 10/2015 |
| KR | 20160006561 | A | | 1/2016 |
| WO | WO-9705052 | A1 | * | 2/1997 ............ B66C 13/08 |
| WO | WO-2018093306 | A1 | * | 5/2018 ............ H01Q 1/005 |

OTHER PUBLICATIONS

English Translation of the PCT International Search Report for International Application No. PCT/EP2017/082061, fated May 9, 2018.

* cited by examiner

METHOD FOR INSTALLING COMPONENTS OF A WIND TURBINE

CROSS-REFERENCE TO RELATED APPLICATIONS

This application claims priority to PCT Application No. PCT/EP2017/082061, having a filing date of Dec. 8, 2017, which is based off of DE Application No. 10 2017 206 527.3, having a filing date of Apr. 18, 2017, the entire contents both of which are hereby incorporated by reference.

FIELD OF TECHNOLOGY

Provided is a method for installing components of a wind turbine, with a lifting device for lifting the respective component hanging at the lifting device via at least one cable.

BACKGROUND

Building a wind turbine involves the installation of several separate components which usually need to be lifted by means of a lifting device like a crane. For building the tower several separate tower segments are to be lifted and stacked above one another. After building the tower the nacelle with the gear box and other preinstalled parts of the drive train needs to be installed. Finally the generator and the hub are installed and respective rotor blades are fixed to the hub. All components, especially the larger ones are lifted by means of the lifting device during installation or when being uninstalled due to maintenance or replacement.

A problem arises, when the respective component hanging at the lifting device via one or several cables starts to swing or vibrate or rotate due to external forces, usually wind. These vibrations bear problems especially when the respective component is positioned to be fixed to another, already installed components. A usual technique is to attach cables or ropes at the component, which are hand held by several workers for stabilizing the component, while it is positioned by means of the lifting device and the interaction of the workers. This way of stabilizing or controlling the movement of wind turbine components during their installation is very effortful for the workers trying to control or stabilize a movement and can provide a control only to a certain extent. This unsatisfying when strong forces like strong winds impact on the component.

SUMMARY

An aspect relates to provide an improved method for installing components for a wind turbine with a better stabilization of the component against vibrations and rotations.

For solving the above-mentioned problem embodiments of the invention proposes that at least one stabilization device is stabilizing the components against movements induced by external forces by means of a gyroscopic effect.

According to embodiments of the invention a stabilization device is provided at the lifting arrangement in the region which can start to swing or vibrate or rotate due to external forces acting on the component hanging at the lifting device. This stabilization device is able to automatically stabilize the component against vibrations, rotations or any kind of movement due to a certain extent by means of a gyroscopic effect. This stabilization device is activated when the lifting device starts to lift the component. As soon as the component starts to swing or move in a direction different to the moving direction effected by the lifting device the stabilization device starts to provide counterforces in reaction of the external forces acting on the component. These counterforces are created by means of a gyroscopic effect. The stabilization device is a gyroscopic stabilization or damping device.

By means of these counterforces created by the gyroscopic working principle of the gyroscopic stabilisation device the overall forces acting on the component are widely reduced, so that any kind of movement or vibration is widely reduced to a very small extent or is completely reduced.

This provides the advantage that during the lifting process the component does not move or swing in an uncontrolled way. Especially when the component is positioned to be attached to previously installed components no specific stabilization action needs to be performed by the workers as it is necessary in the prior art by means of the hand held ropes. As the stabilization is performed by the stabilization device the workers are solely responsible for the precise orientation of the component to the previously installed component, if this cannot be done solely by the lifting device. The stabilization device (gyroscope) can also be remote controlled by a worker or operator to precisely orientate and position the component. This could also be done automatically by means of an automatic control unit which controls the stabilization device to hold the component in a present direction or orientation.

The stabilization itself is provided by means of a rotating flywheel which is tilted by means of a tilting device around at least one axis with a vertical orientation to the axis of rotation of the flywheel. The stabilization device, which can also be called a control moment gyroscope, comprises the rotating flywheel which is enclosed in a rigid casing. The flywheel spins at speeds up several hundred kilometres per hour around its centre axis. A tilting device which tilts the casing around at least one axis perpendicular to the central rotation axis of the flywheel tilts the casing and the flywheel for changing the momentum created by the flywheel, which tilting action results in the counterforce. This control moment or control force, which can also be named as a gyroscopic resistance force, has a certain direction and extinguishes the external force acting on the component. This gyroscopic stabilization device is designed to produce high moments or reaction forces which can counter or extinguish the external forces to a high extent or completely.

Furthermore, it is advantageous to provide a sensor device which provides measurement values regarding the force induced movements like vibrations or rotations with the stabilizing device being controlled based on the measurement values. The sensor device can be part of or attached to the stabilization device in a region which is not moved by the tilting device, as the sensor device is used for measuring any kind of vibrations or swinging or rotating movement.

The stabilization device can be attached to several items of the arrangement which can start swinging or moving due to external forces. It can be attached directly to the component. The component is for example a rotor blade, a nacelle, a hub, a tower section, a generator or a gear box, with this enumeration is not conclusive. The stabilization device comprises respective attachment or fixation means to be easily fixed to and removed from the respective component.

Alternatively, the stabilization device can be attached to a handling tool carrying the component. Such a handling tool is for example a lifting frame or lifting yoke which is attached to the lifting device via one or several cables, at which lifting frame or lifting yoke the respective component is attached by means of further cables.

In another alternative the stabilization device can be attached to a fixation tool for connecting the component or the handling tool to a fixation means of the lifting device. The fixation means is for example a hook at which the respective cables are attached to. The fixation tool is for example a fixation frame which is attached to the hook via several cables. A handling tool is for example attached to the fixation tool by means of other cables, with the handling tool like the mentioned lifting frame or lifting yoke is firmly attached to the component.

Finally the stabilization device can be attached to the at least one cable, while usually several cables are used for for example connecting the fixation tool to the fixation means like the hook or the like. The mentioned examples show that there are several places or positions where the gyroscope can be attached to, which positions are appropriate for inducing the stabilization or reaction forces into the vibrating or swinging or rotating system.

Embodiments of the invention furthermore relates to a lifting arrangement for lifting components during the installation of a wind turbine, comprising a lifting device and a component attached to the lifting device via at least one cable, characterized in that at least one stabilization device is provided for stabilizing the component against movements induced by external forces by means of a gyroscopic effect.

The stabilization device comprises a rotating flywheel and a tilting device for tilting the flywheel around at least one axis with a vertical orientation to the axis of rotation of the flywheel. It is certainly possible that the rotating flywheel, which is encased in a closed casing, can be tilted also around a second axis, which is also vertical to the axis of rotation of the flywheel, so that in total three axis being perpendicular to each other are provided. The stabilization device gyroscope can also be called a control moment gyroscope.

In a further embodiment of the invention a sensor device is provided for providing measurement values regarding the force induced movements like vibrations or rotations with the stabilization device being controlled based on the measurement values.

The stabilization device of the inventive lifting device can be attached to various items within the swinging or vibrating or rotating system of the lifting device. It can be attached to the component itself, alternatively it can be attached to handling tool like a handling frame or handling yoke carrying the component. It can also be attached to a fixing tool for connecting the component or the handling tool to a fixing means like a hook of the lifting device, which hook is attached to at least one lifting cable of the lifting device. Finally it can be attached to the at least one cable itself or to a bunch of cables.

The component being lifted by means of the lifting device can for example be a rotor blade, a nacelle, a hub, a tower section, a generator or a gear box, but certainly also any other component which needs to be lifted by means of the lifting device like a crane.

BRIEF DESCRIPTION

Some of the embodiments will be described in detail, with reference to the following figures, wherein like designations denote like members, wherein.

DETAILED DESCRIPTION

Figure 1:
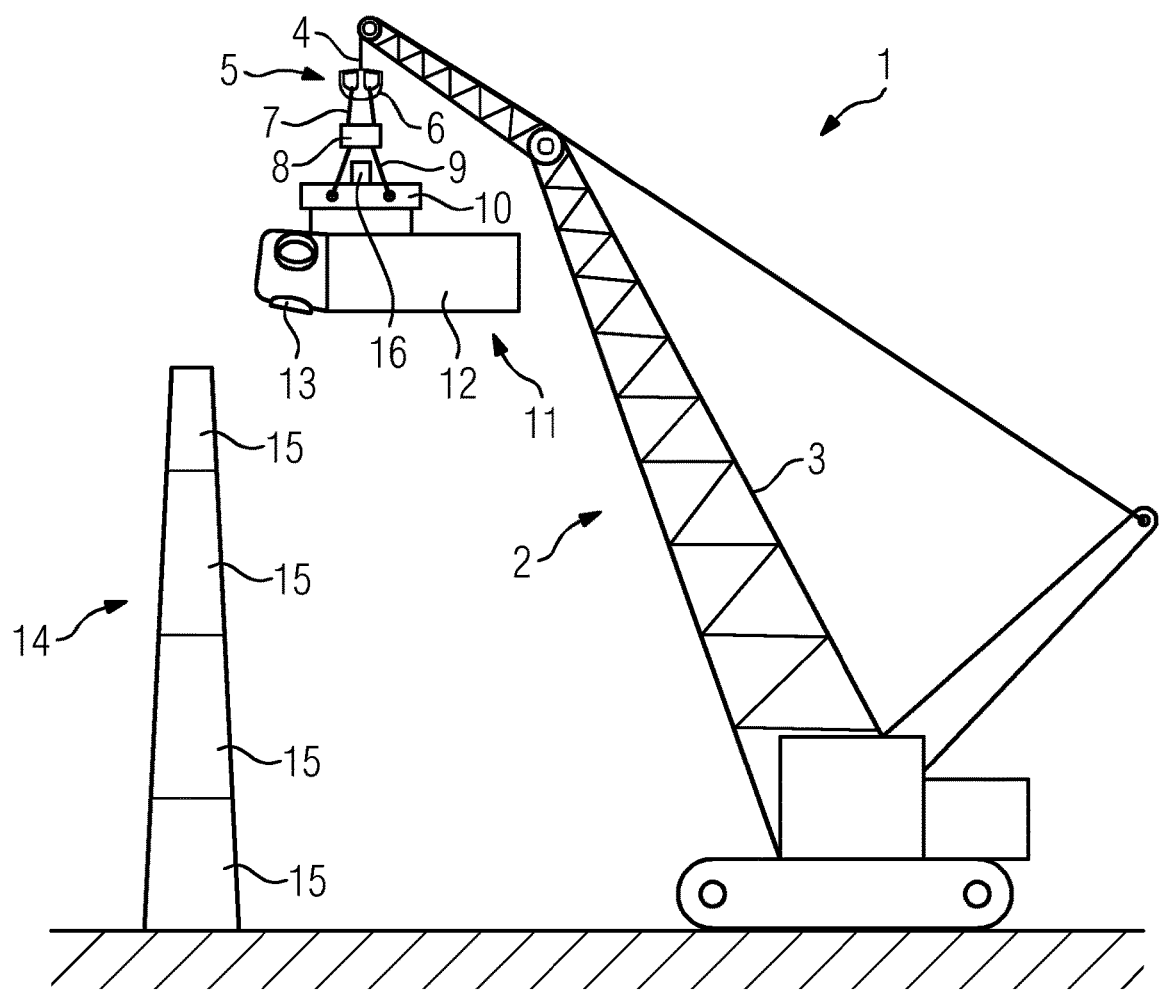
FIG. 1 shows an inventive lifting arrangement.

FIG. 1 shows an inventive lifting arrangement 1 comprising a lifting device 2, here a crane 3. The lifting device 2 comprises at least one lifting cable 4, to which a fixation means or attachment 5, here a hook 6, is attached. The hook 6 is connected via further cables 7 to a fixation tool 8. This fixation tool is for example a fixation frame or a fixation yoke, to which via further cables 9 a handling tool 10 is attached. The handling tool 10, also for example a handling frame or handling yoke, is connected to a component 11, for example a nacelle 12 comprising a hub 13, which shall be installed to a tower installation 14 being built from several tower segments 15 stacked above one another. These tower segments 15 have also been lifted and installed by the lifting arrangement 1.

The lifting arrangement 1 further comprises a stabilization device 16, which is used for stabilizing the component 11 respectively the complete system comprising all items hanging at the hook 6 against movements like or vibrations or rotations due to external forces, especially strong wind forces acting on the component 11.

The stabilization device creates forces or moments which are able to counter or extinguish the external forces inducing the movement like vibrations or rotations, and thus the movement itself.

The stabilizing device comprises a flywheel rotating at high speed around a central axis. A tilting device can tilt the casing in which the rotating flywheel is arranged around at least one axis, which axis is vertical to the axis of rotation of the flywheel. It is possible that the tilting device can tilt the casing also around a second axis, which is itself perpendicular to the first tilting axis and the rotation axis, thus three axes being perpendicular to each other are provided.

Due to the high speed rotation of the flywheel and the tilting movement reaction moment or reaction forces are created which counteract the external forces acting on the component 11 respectively the moving system.

This stabilization enables a very stable, non-swinging and non-rotating lifting and positioning action of the component 11 relative to a previously installed component, to which the component 11 shall be attached.

Figure 2:
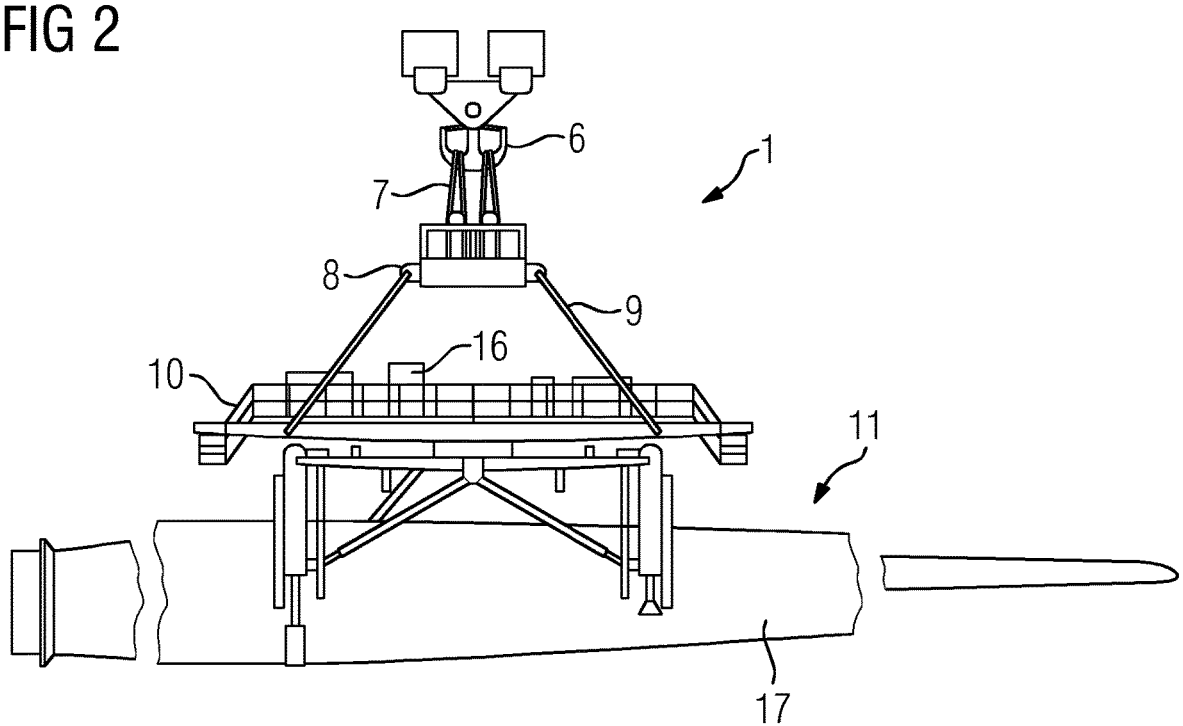
FIG. 2 shows a part of a lifting arrangement with a stabilization device attached to a handling tool handling a rotor blade.

FIG. 2 shows a first example of a part of the inventive lifting arrangement 1. It shows the component 11 in form of a rotor blade 17 being firmly attached to a handling tool 10. The handling tool 10 is attached via cables 9 to a fixation tool 8, which is attached by cables 7 to the hook 6.

The gyroscopic stabilization device 16, which can also be called a control moment gyroscope, is in this example attached to the handling tool 10. It is firmly secured to the handling tool 10, so that any gyroscopic reaction or resistance force resulting from the flywheel movement and the tilting action act directly on the handling tool 10 for stabilizing its movement and thus the complete movement of the whole swinging or rotating system.

Figure 3:
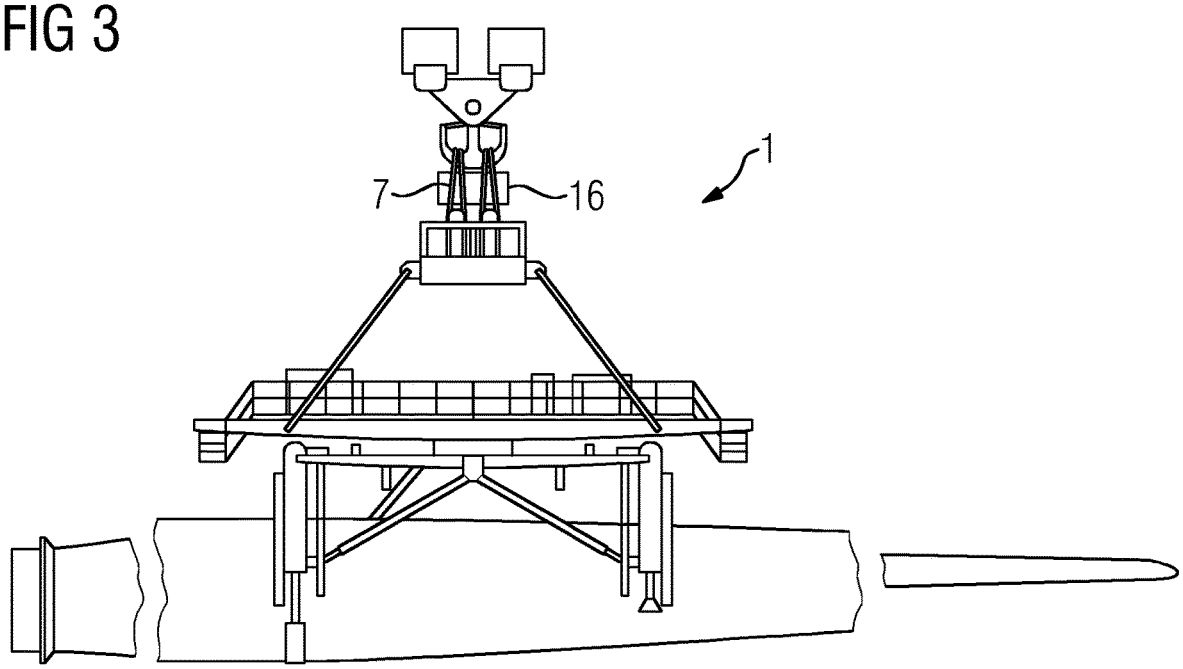
FIG. 3 shows the arrangement of FIG. 2 with the stabilization device being attached to a fixation tool, with a rotor blade being attached to the handling tool.

FIG. 3 shows an arrangement according to FIG. 1, with the same setup. In this embodiment the gyroscope, i.e. the stabilization device 16, is attached to the bundle of cables 7, which are also part of the swinging system. A stabilization can also be performed when directing the gyroscopic resistance forces into the cable arrangement.

Figure 4:
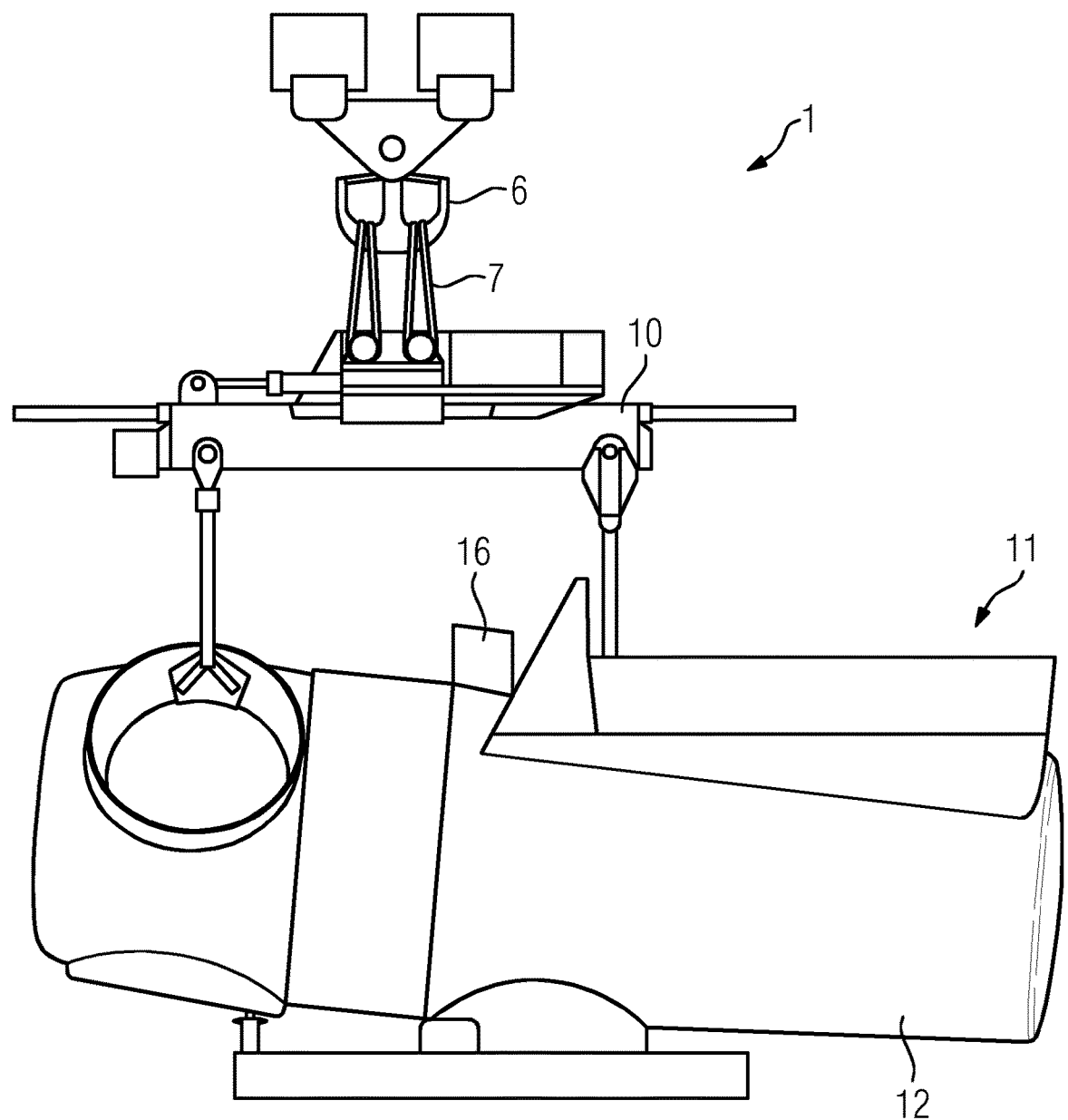
FIG. 4 shows an arrangement with the stabilization device being directly attached to a nacelle fixed to a handling tool.

FIG. 4 shows a part of an inventive lifting arrangement 1, comprising the hook 6 with cables 7 connecting the hook 6 to a handling tool 10. Firmly attached to the handling tool 10 is the component 11, here the nacelle 12.

The gyroscopic stabilization device 16 is directly attached to the nacelle 12, here for example at an upper part of the nacelle 12. It is obvious that the stabilization device can be arranged also in other parts of the nacelle 12, as long as it is firmly attached to the nacelle 12, so that the reaction or resistance forces can directly act on the nacelle 12 for stabilizing any kind of movement.

Figure 5:
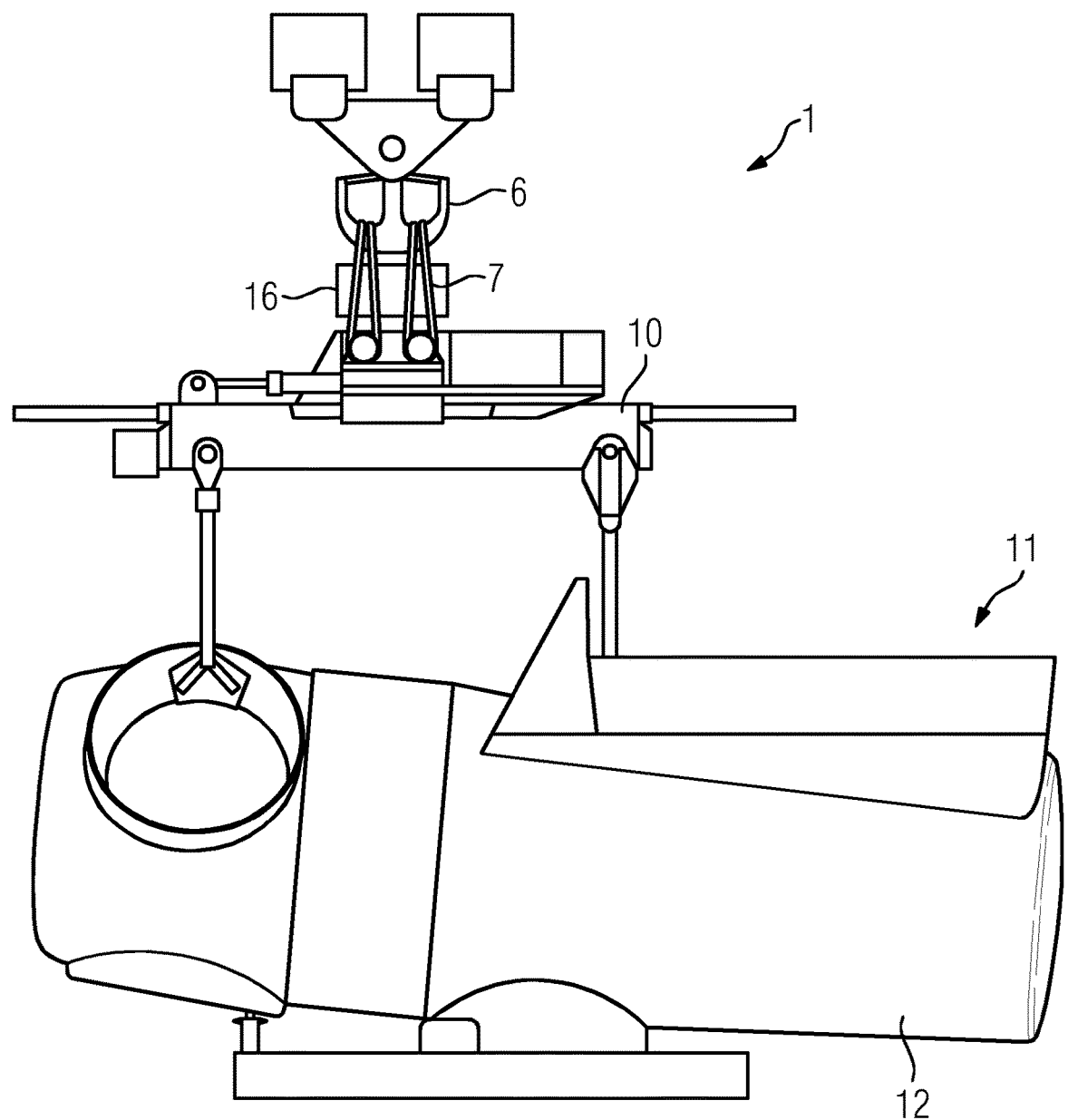
FIG. 5 shows the arrangement of FIG. 4 with the stabilization device being attached to a bunch of cables connecting the handling tool to a fixation means or an attachment of the lifting device.

FIG. 5 shows another embodiment of a partially shown lifting arrangement 1. The setup corresponds to the setup shown in FIG. 4. In this embodiment the gyroscopic stabilization means or gyroscopic stabilizer 16 is again attached to the bunch of cables 7 connecting the hook 6 to the handling tool 10. It is attached somewhere between the hook 6 and the handling tool 10. Its resistance or reaction forces act on the bundle of cables 7 and thus stabilize the whole swinging or rotating system.

Figure 6:
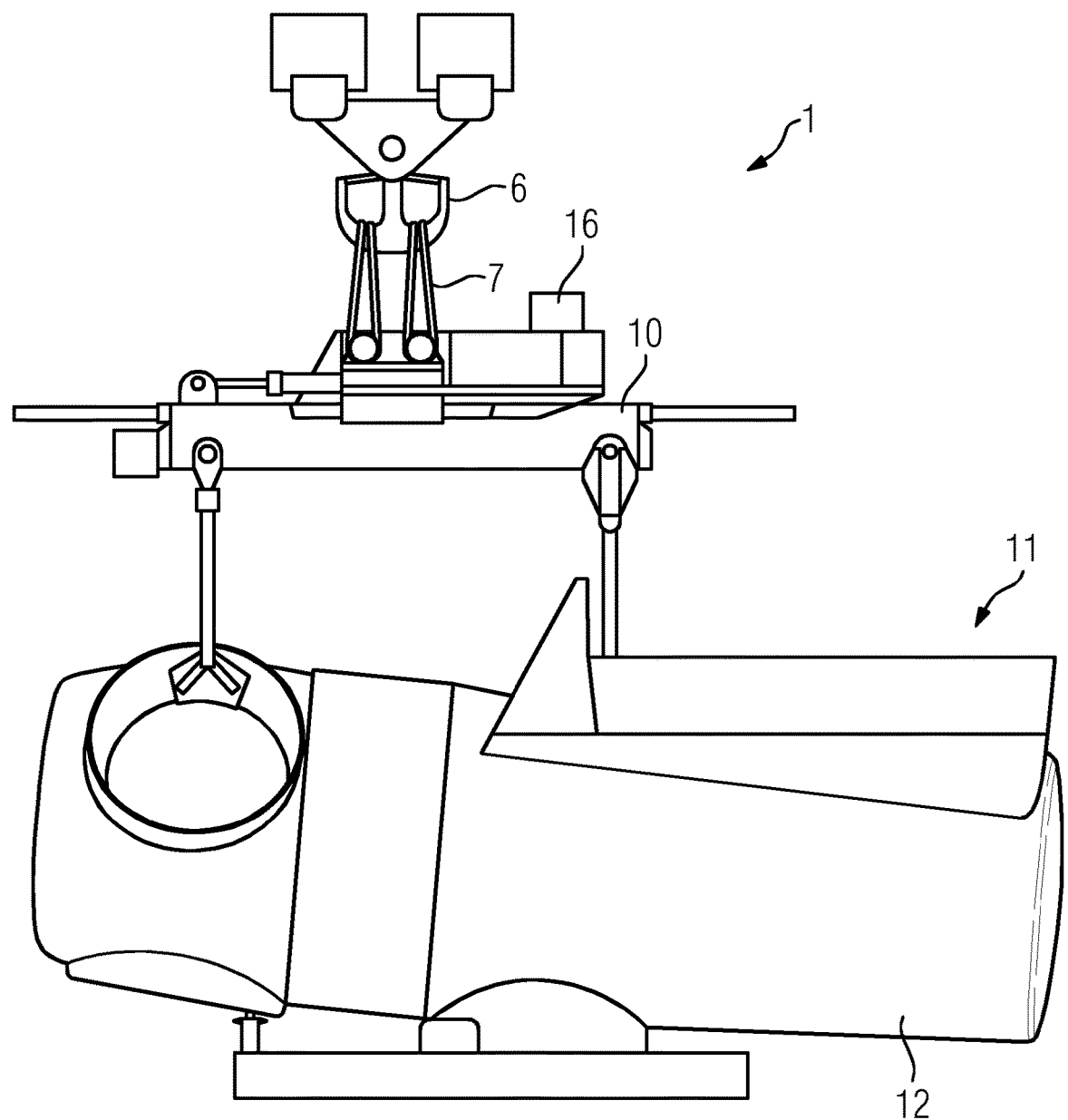
FIG. 6 shows the arrangement of FIG. 4 with the stabilization device being attached to the handling tool.

FIG. 6 shows another embodiment of a lifting arrangement 1 shown only in part. The setup correspondence to a setup shown in FIGS. 4 and 5. In this embodiment the gyroscopic device 16 is directly attached to the handling tool 10. It is obvious that the stabilization device 16, which is firmly attached to the handling tool 10 can be positioned at various locations at the handling tool 10.

Figure 7:
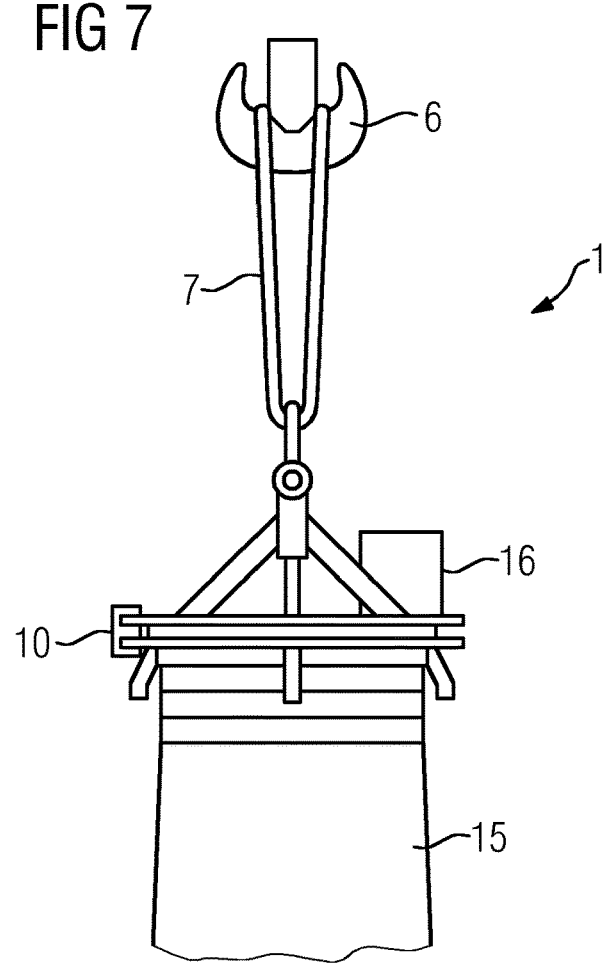
FIG. 7 shows an arrangement with the stabilization device being attached to a handling tool fixed to a tower section.

FIG. 7 shows a further embodiment of an inventive lifting arrangement 1, which is shown only in part. The figure shows the hook 6 and the cables 7 connecting the hook 6 to a handling tool 10. The handling tool 10 is attached to a tower segment 15, which shall be installed either on the bottom at a respective foundation or which shall be attached to a previously installed tower segment 15.

The gyroscopic stabilization device 16 is attached to the frame-like handling tool 10 for stabilizing the system.

It is to be noted, that it is also possible to attach the stabilization device 16 to the tower segment 15, if there are respective means at the tower segment 15 to which the stabilization device 16 can be firmly attached. Especially when the tower segment 15 is the lowest or bottom segment, which usually comprises a bottom, the stabilization device 16 can be directly attached to the bottom of this bottom segment 15.

Figure 8:
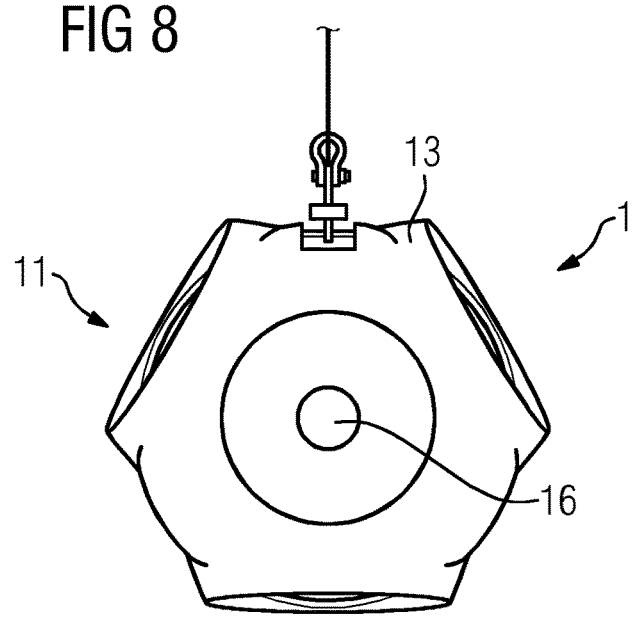
FIG. 8 shows an arrangement with the stabilization device being attached to a hub.

FIG. 8 shows another embodiment with the component 11 hanging at the hook being a hub 13. The gyroscopic stabilization device 16 is mounted directly on the hub 13.

Figure 9:
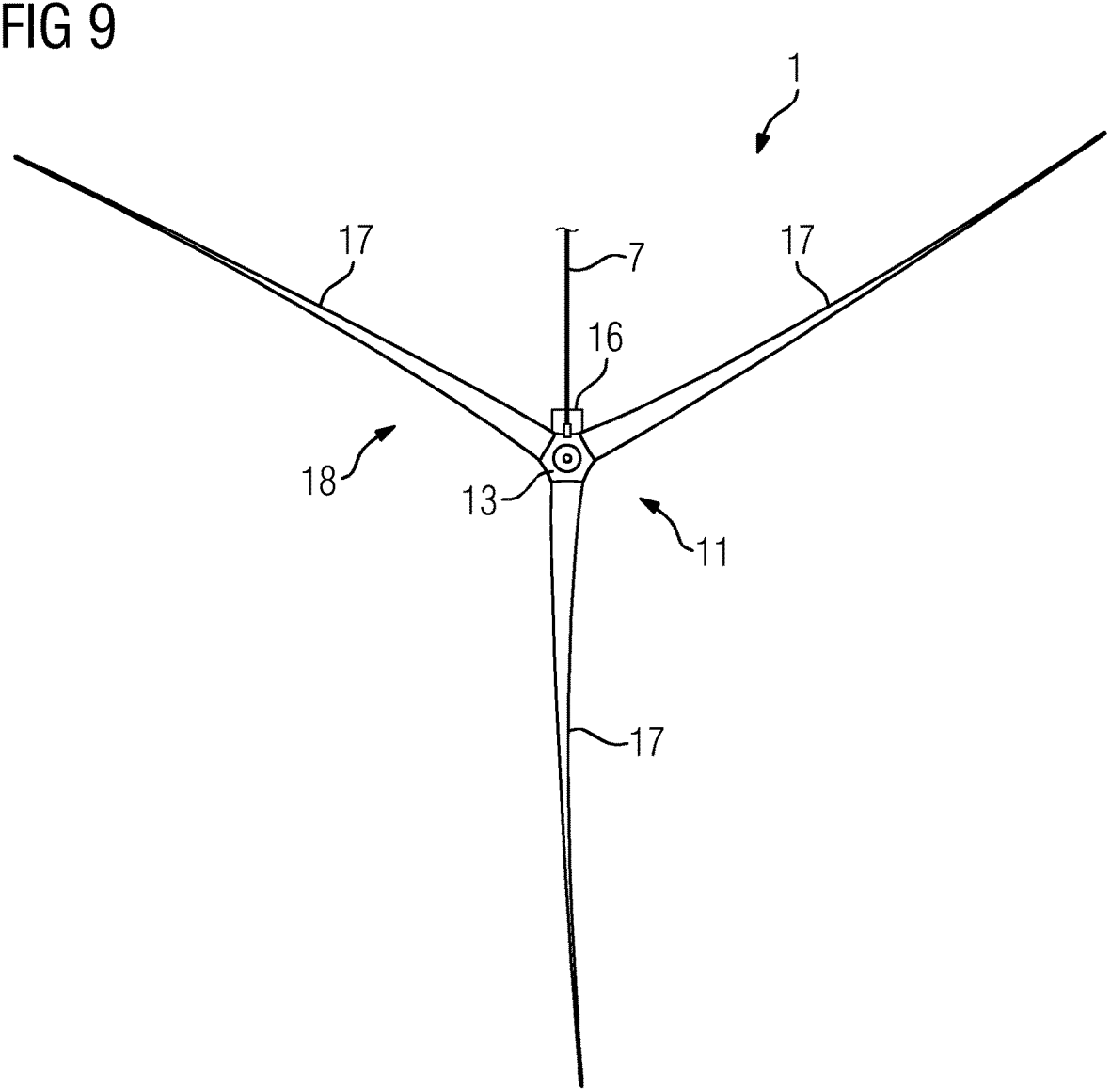
FIG. 9 shows an arrangement with the fixation device being directly attached to a complete rotor.

FIG. 9 shows an embodiment of a lifting arrangement 1, which is again shown only in part. The component 11 which shall be lifted is a complete rotor 18 comprising three rotor blades 17 being attached to the hub 13. The hub 13 and thus the complete rotor 18 is attached to the lifting device 2 via a cable 7 connecting it, for example, directly to the hook 6.

The gyroscopic stabilization device 16 is directly attached to the hub 13 stabilizes any unwanted movement of the component 11 respectively the rotor 18.

Figure 10:
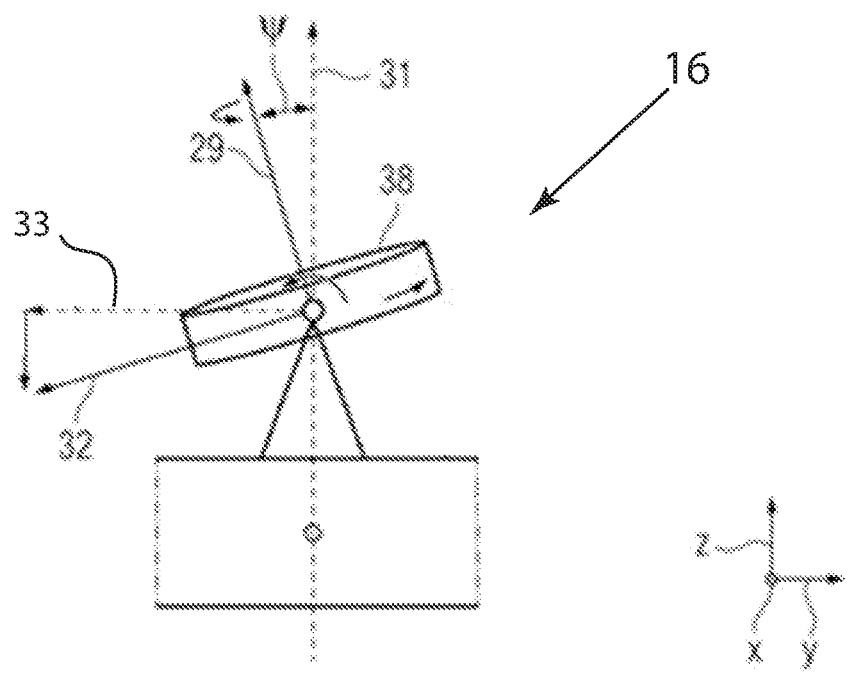
FIG. 10 shows a depiction of the stabilization device in more detail according to an embodiment.

In FIG. 10 schematically the gyroscopic stabilization device 16 is shown. The gyroscopic stabilization device 16 includes the rotating flywheel 38 which rotates around a rotational axis 29. Further, the gyroscopic stabilization device 16 may be capable of being tilted. For example, as shown in FIG. 10, the gyroscopic stabilization device 16 and/or the rotating flywheel 38 is tilted around a first axis by an angle $\psi$ as shown. Thus, the rotational axis 29 differs from or is deflected from a normal vertical axis 31 and a horizontal axis 32 of the rotating flywheel 38 differs from or is deflected from a normal horizontal axis 33. As discussed above, the gyroscopic stabilization device 16 may also be capable of being tilted around a second axis perpendicular to the first axis.

While not shown, the stabilization device 16 comprises at least one sensor means or sensor which senses any kind of movement or vibration or rotation of the respective component or the swinging or rotating system, which vibration or rotation needs to be stabilized or counteracted. Based on the sensor measurement the stabilization device 16 is controlled by a respective controlling device, which especially controls the tilting action and thus the counter or resistance forces produced for countering or extinguishing the respective unwanted vibrations or rotations.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for installing components of a wind turbine, comprising:
   providing a lifting device for lifting a respective component hanging at the lifting device via at least one cable,
   providing at least one stabilization device for stabilizing the component against movements induced by external forces by a gyroscopic effect and attaching the at least one stabilization device to the component,
   rotating a flywheel of the at least one stabilization device around an axis of rotation of the flywheel,
   tilting the flywheel around a second axis perpendicular to the axis of rotation of the flywheel, and
   tilting the flywheel around a third axis, wherein the third axis is perpendicular to the axis of rotation of the flywheel and perpendicular to the second axis,
   wherein the steps of rotating the flywheel and tilting the flywheel result in gyroscopic resistance force that stabilizes the component during installation.

2. The method according to claim 1, wherein a sensor device provides measurement values regarding the movements induced by external forces with the stabilizing device being controlled based on the measurement values.

3. The method according to claim 1, wherein the component is a rotor blade, a nacelle, a hub, a tower section, a generator or a gear box.

4. A lifting arrangement for lifting components during the installation of a wind turbine, comprising:
- a lifting device,
- a component attached to the lifting device via at least one cable, and
- at least one stabilization device, wherein the at least one stabilization device is provided for stabilizing the component against movements induced by external forces by a gyroscopic resistance force, wherein the stabilization device comprises a flywheel rotating around an axis of rotation and is configured for tilting the flywheel around a second axis and a third axis, wherein the second axis is perpendicular to the axis of rotation of the flywheel and the third axis is perpendicular to the axis of rotation of the flywheel and perpendicular to the second axis, and wherein the at least one stabilization device is configured to be attached to the component.

5. The lifting arrangement according to claim 4, wherein a sensor device is provided for providing measurement values regarding the movements induced by external forces with the at least one stabilization device being controlled based on the measurement values.

6. The lifting arrangement according to claim 4, wherein the component is a rotor blade, a nacelle, a hub, a tower section, a generator or a gear box.

7. The lifting arrangement according to claim 4, wherein the at least one stabilization device is directly attached to the component.

8. The method according to claim 1, wherein the at least one stabilization device is directly attached to the component.

9. A method for installing components of a wind turbine, comprising:
- providing a lifting device for lifting a respective component hanging at the lifting device via at least one cable,
- providing at least one stabilization device for stabilizing the component against movements induced by external forces by a gyroscopic effect and directly attaching the at least one stabilization device to the component,
- rotating a flywheel of the at least one stabilization device around an axis of rotation of the flywheel, and
- tilting the flywheel around a second axis perpendicular to the axis of rotation of the flywheel,
- wherein the steps of rotating the flywheel and tilting the flywheel result in gyroscopic resistance force that stabilizes the component during installation.

10. The method according to claim 9, wherein a sensor device provides measurement values regarding the movements induced by external forces with the stabilizing device being controlled based on the measurement values.

11. The method according to claim 9, wherein the component is a rotor blade, a nacelle, a hub, a tower section, a generator or a gear box.

12. The method according to claim 9, further comprising tilting the flywheel around a third axis, wherein the third axis is perpendicular to the axis of rotation of the flywheel and perpendicular to the second axis.

* * * * *